US009961606B2

United States Patent
Wu

(10) Patent No.: US 9,961,606 B2
(45) Date of Patent: May 1, 2018

(54) METHOD OF HANDLING SIMULTANEOUS COMMUNICATIONS AND RELATED COMMUNICATION DEVICE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 180 days.

(21) Appl. No.: 14/757,759

(22) Filed: Dec. 23, 2015

(65) Prior Publication Data

US 2016/0183151 A1 Jun. 23, 2016

Related U.S. Application Data

(60) Provisional application No. 62/095,791, filed on Dec. 23, 2014.

(51) Int. Cl.
*H04W 16/32* (2009.01)
*H04W 24/10* (2009.01)
(Continued)

(52) U.S. Cl.
CPC .......... *H04W 36/30* (2013.01); *H04W 16/32* (2013.01); *H04W 24/02* (2013.01); *H04W 24/08* (2013.01);
(Continued)

(58) Field of Classification Search
CPC .......... H04W 8/08–8/16; H04W 8/24–8/245; H04W 16/32; H04W 24/00–24/04;
(Continued)

(56) References Cited

U.S. PATENT DOCUMENTS

| 2015/0117183 | A1* | 4/2015 | Heo | .......... H04W 36/0055 370/228 |
| 2015/0304860 | A1* | 10/2015 | Liu | .......... H04W 16/32 370/329 |
| 2016/0309526 | A1* | 10/2016 | Quan | .......... H04W 48/08 370/328 |

FOREIGN PATENT DOCUMENTS

| CN | 102378403 A | 3/2012 |
| CN | 103517355 A | 1/2014 |

(Continued)

OTHER PUBLICATIONS

3GPP TS 36.331 V12.4.0 (Dec. 2014) Technical Specification 3rd Generation Partnership Project; Technical Specification Group Radio Access Network; Evolved Universal Terrestrial Radio Access (E-UTRA); Radio Resource Control (RRC); Protocol specification (Release 12).

(Continued)

*Primary Examiner* — Timothy J Weidner
(74) *Attorney, Agent, or Firm* — Winston Hsu

(57) ABSTRACT

A method of handling simultaneous communications comprises a first base station configuring a radio resource control (RRC) connection to a communication device; the first base station configuring a second base station as a secondary base station to the communication device; the second base station configuring a signalling radio bearer (SRB) to the communication device via the first base station; the second base station transmitting a second measurement configuration to the communication device; the second base station receiving a second measurement report corresponding to the second measurement configuration via the SRB from the communication device; and the second base station adding a secondary cell (SCell) of the second base station to the communication device, releasing a SCell of the communication device, or changing a primary secondary cell (PSCell) of the
(Continued)

communication device via the first base station or via the SRB.

15 Claims, 6 Drawing Sheets

(51) Int. Cl.
H04W 28/02 (2009.01)
H04W 36/30 (2009.01)
H04W 76/02 (2009.01)
H04W 88/06 (2009.01)
H04W 92/20 (2009.01)
H04W 24/08 (2009.01)
H04W 36/08 (2009.01)
H04W 24/02 (2009.01)
H04W 36/00 (2009.01)
H04W 76/06 (2009.01)
H04W 76/04 (2009.01)
H04W 88/10 (2009.01)
H04W 92/02 (2009.01)

(52) U.S. Cl.
CPC ....... H04W 24/10 (2013.01); H04W 28/0226 (2013.01); H04W 36/0022 (2013.01); H04W 36/08 (2013.01); H04W 76/025 (2013.01); H04W 76/04 (2013.01); H04W 76/06 (2013.01); H04W 88/06 (2013.01); H04W 88/10 (2013.01); H04W 92/02 (2013.01); H04W 92/20 (2013.01)

(58) Field of Classification Search
CPC .......... H04W 24/08; H04W 24/10; H04W 28/02–28/0263; H04W 36/00–36/385; H04W 48/18–48/20; H04W 68/12; H04W 72/04–72/10; H04W 76/00–76/068; H04W 84/18–84/22; H04W 88/06–88/10; H04W 92/02; H04W 92/01; H04W 8/30; H04W 12/92; H04W 92/22
See application file for complete search history.

(56) References Cited

FOREIGN PATENT DOCUMENTS

CN 104202768 A 12/2014
WO 2010104334 A2 9/2010
WO 2014156397 A1 10/2014

OTHER PUBLICATIONS

3GPP TSG-RAN2 Meeting #88 R2-145301 San Francisco, USA, Nov. 17-21, 2014 CR-Form-v11 Change Request 36.331 CR 1687 rev—Current version: 12.3.0.
3GPP TSG-RAN WG2 Meeting #88 R2-145410 San Francisco, USA, Nov. 17-21, 2014 CR-Form-v11 Change Request 36.300 CR 0675 rev—Current version: 12.3.0.
Office action dated Dec. 8, 2016 for EP application No. 15201998, pp. 1-6.
Qualcomm Incorporated, "Dual Connectivity SRB options, for Signaling Load Reduction", 3GPP TSG-RAN WG2 meeting #83, R2-132858, Aug. 19-23, 2013 , XP050718566, pp. 1-4.
Office action dated Jun. 14, 2016 for the EP application No. 15201998.0, pp. 1-7.
Fujitsu, "Discussion on SRB via SeNB for dual connectivity", 3GPP TSG-RAN WG2 Meeting #84, R2-134077, 11th-115th Dec. 2013, San Francisco, USA, XP050736879, pp. 1-3.
Search Report dated Jun. 7, 2016 for EP application No. 15201998.0, pp. 1-8.
Alcatel-Lucent, Alcatel-Lucent Shanghai Bell, "Discussion on SeNB RRM", 3GPP TSG RAN WG2 Meeting #86, R2-142575, May 19-23, 2014, Seoul, South Korea, XP050818871, pp. 1-5.
NSN, Nokia Corporation, "RRM measurements for Dual Connectivity", 3GPP TSG-RAN WG2 Meeting #86, R2-142317, May 19-23, 2014, Seoul, Korea, XP050818438, pp. 1-9.
Office action dated Mar. 17, 2017 for the Taiwan application No. 104143344, filing date Dec. 23, 2015, p. 1-10.

* cited by examiner

METHOD OF HANDLING SIMULTANEOUS COMMUNICATIONS AND RELATED COMMUNICATION DEVICE

CROSS REFERENCE TO RELATED APPLICATIONS

This application claims the benefit of U.S. Provisional Application No. 62/095,791, filed on Dec. 23, 2014 and incorporated herein by reference.

BACKGROUND OF THE INVENTION

1. Field of the Invention

The present invention relates to a method and communication device used in a wireless communication system, and more particularly, to a method and communication device of handling simultaneous communications.

2. Description of the Prior Art

A long-term evolution advanced (LTE-A) system, as its name implies, is an evolution of the LTE system. The LTE-A system includes advanced techniques, such as carrier aggregation (CA), dual connectivity, etc. A user equipment (UE) receives/transmits packets from/to two evolved Node-Bs (eNBs), when the UE is configured to dually connect to the two eNBs in the dual connectivity. One of the two eNBs is a master eNB (MeNB) of the UE and the other is a secondary eNB (SeNB) of the UE in the dual connectivity.

Currently, mobility management and radio resource management for the UE are only performed by the MeNB in the dual connectivity. As a result, the SeNB is not able to improve the performance of the mobility management and radio resource management for the UE.

Thus, how to improve the performance of the mobility management and radio resource management of the SeNB is an important problem to be solved.

SUMMARY OF THE INVENTION

The present invention therefore provides a method and related communication device for handling simultaneous communications to solve the abovementioned problem.

A method of handling simultaneous communications between a communication device, a first base station and a second base station comprises the first base station configuring a radio resource control (RRC) connection to the communication device; the first base station transmitting a first measurement configuration via the RRC connection to the communication device, wherein the first measurement configuration comprises a first measurement identity; the first base station configuring the second base station as a secondary base station to the communication device; the second base station configuring a signalling radio bearer (SRB) to the communication device via the first base station; the second base station transmitting a second measurement configuration to the communication device; the first base station receiving a first measurement report corresponding to the first measurement configuration via the RRC connection from the communication device; the second base station receiving a second measurement report corresponding to the second measurement configuration via the SRB from the communication device; and the second base station adding a secondary cell (SCell) of the second base station to the communication device, releasing a SCell of the communication device, or changing a primary secondary cell (PSCell) of the communication device via the first base station or via the SRB, in response to the second measurement report.

A second base station for handling simultaneous communications between a communication device, a first base station and the second base station comprises a storage unit for storing instructions and a processing means coupled to the storage unit. The processing means is configured to execute the instructions stored in the storage unit. The instructions comprise configuring a signalling radio bearer (SRB) to the communication device via the first base station; transmitting a measurement configuration to the communication device; receiving a measurement report corresponding to the measurement configuration via the SRB from the communication device; and adding a secondary cell (SCell) of the second base station to the communication device, releasing a SCell of the communication device, or changing a primary secondary cell (PSCell) of the communication device via the first base station or via the SRB, in response to the measurement report.

A communication device for handling simultaneous communications with a first base station and a second base station comprises a storage unit for storing instructions and a processing means coupled to the storage unit. The processing means is configured to execute the instructions stored in the storage unit. The instructions comprise establishing a radio resource control (RRC) connection to the first base station; receiving a first measurement configuration via the RRC connection from the first base station; being configured the second base station as a secondary base station by the first base station; being configured a signalling radio bearer (SRB) via the first base station by the second base station; receiving a second measurement configuration from the second base station; transmitting a first measurement report corresponding to the first measurement configuration via the RRC connection to the first base station; transmitting a second measurement report corresponding to the second measurement configuration via the SRB to the second base station; and adding a secondary cell (SCell) of the second base station, release a SCell, or change a primary secondary cell (PSCell) in response to a secondary cell group (SCG) configuration, wherein the SCG configuration is transmitted by the second base station via the first base station or via the SRB, in response to the second measurement report.

A communication device for handling simultaneous communications with a first base station and a second base station comprises a storage unit for storing instructions and a processing means coupled to the storage unit. The processing means is configured to execute the instructions stored in the storage unit. The instructions comprise establishing a radio resource control (RRC) connection to the first base station; being configured the second base station as a secondary base station by the first base station via the RRC connection; being configured a signalling radio bearer (SRB) via the first base station by the second base station; receiving a first RRC message from the first base station via another SRB of the RRC connection and a second RRC message from the second base station via the SRB; and processing the first RRC message and the second RRC message jointly.

DETAILED DESCRIPTION

Figure 1:
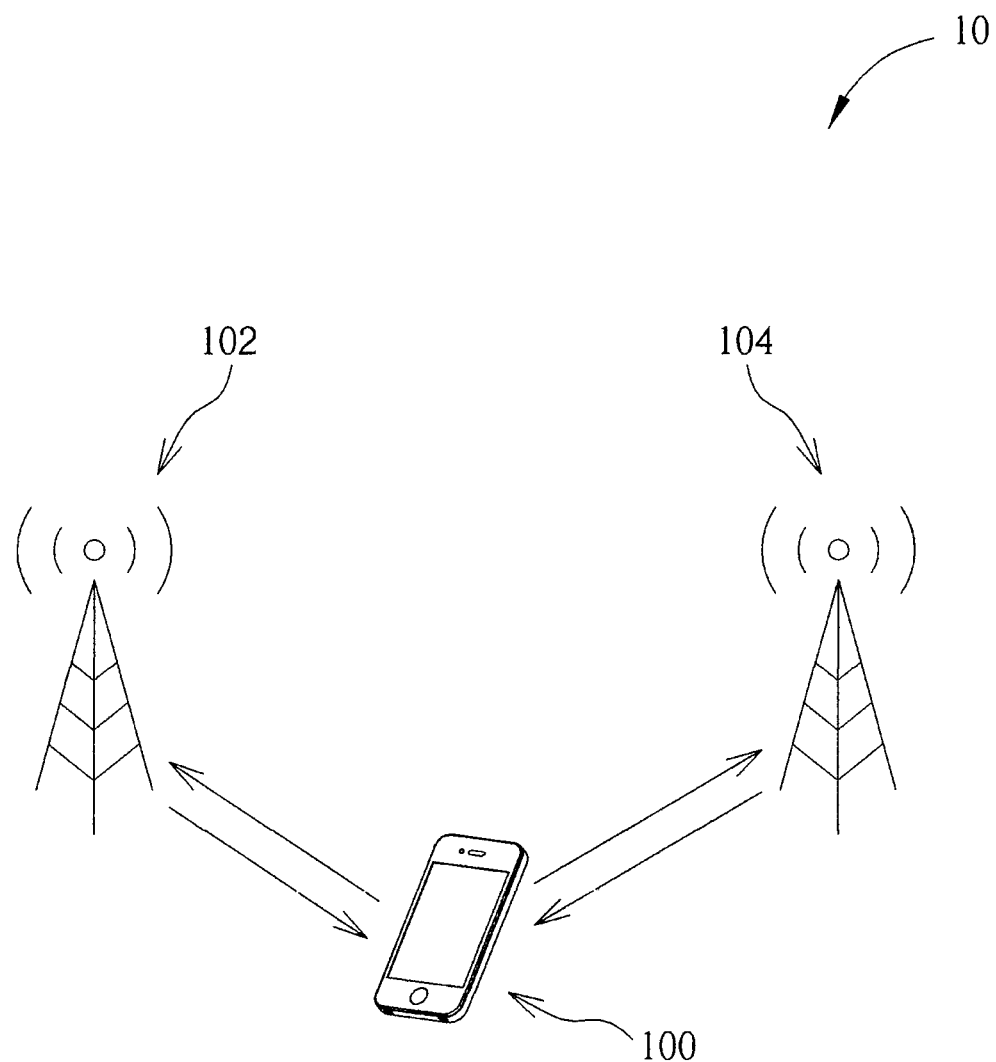
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and a BS 104. In FIG. 1, the communication device 100, the BS 102 and the BS 104 are simply utilized for illustrating the structure of the wireless communication system 10. Practically, the BS 102 and/or the BS 104 may be evolved NB(s) (eNB(s)) and/or relay(s) station in an evolved UTRAN (E-UTRAN), a long term evolution (LTE) system, a LTE-Advanced (LTE-A) system or an evolution of the LTE-A system. In FIG. 1, coverage areas of the BSs 102 and 104 may be partly overlapped.

As shown in FIG. 1, the communication device 100 may be configured to communicate with the BSs 102 and 104 at the same time according to dual connectivity configured to the communication device 100. That is, the communication device 100 may perform a transmission/reception via both the BSs 102 and 104, e.g., at different carrier frequencies. For example, the communication device 100 may receive packets from the BS 102 at one carrier frequency and the BS 104 at another carrier frequency, or the communication device 100 may transmit packets (e.g., protocol data units) to the BS 102 at one carrier frequency and the BS 104 at another carrier frequency. In general, it means that the communication device 100 receives the packets from at least one cell of the BS 102 and/or at least one cell of the BS 104. Similarly, it also means that the communication device 100 transmits the packets to at least one cell of the BS 102 and/or at least one cell of the BS 104. In addition, one of the BSs 102 and 104 may be a master eNB (MeNB) and the other BS may be a secondary eNB (SeNB) as defined in 3rd Generation Partnership Project (3GPP). One of the cell(s) of the MeNB communicating with the communication device 100 may be a primary cell (PCell) and the other cell(s) (if available) of the MeNB may be secondary cell(s) (SCell(s)). One of the cell(s) of the SeNB communicating with the communication device 100 may be a primary SCell (PS-Cell), and the other cell(s) (if available) of the SeNB may be SCell(s).

The communication device 100 may be a user equipment (UE), a mobile phone, a laptop, a tablet computer, an electronic book, a portable computer system, a vehicle or an airplane. In addition, for an uplink (UL), the communication device 100 is a transmitter and the BS(s) 102 and/or 104 are/is a receiver(s), and for a downlink (DL), the BS(s) 102 and/or 104 are/is a transmitter(s) and the communication device 100 is a receiver.

Figure 2:
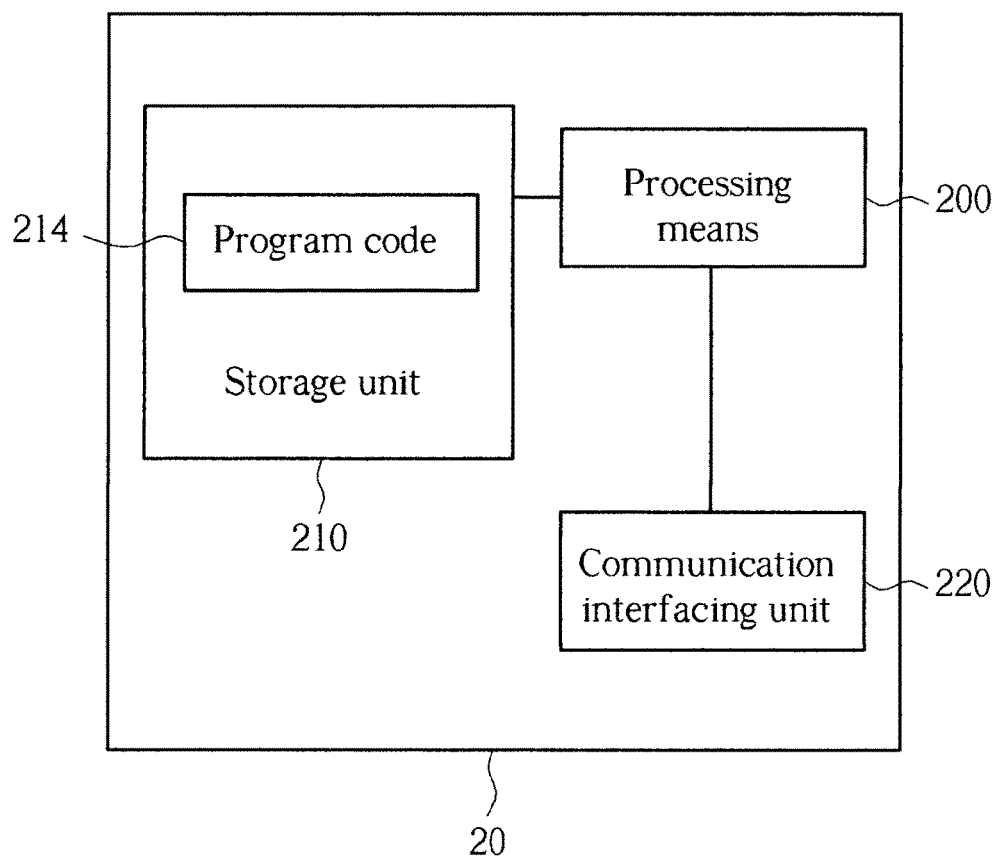
FIG. 2 is a schematic diagram of a communication device according to an example of the present invention.

FIG. 2 is a schematic diagram of a communication device 20 according to an example of the present invention. The communication device 20 may be the communication device 100, the BS(s) 102 and/or 104 shown in FIG. 1, but is not limited herein. The communication device 20 includes a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is a transceiver and is used to transmit and receive signals (e.g., data, messages and/or packets) according to processing results of the processing means 200.

A protocol architecture maybe used for illustrating that the use of a radio bearer depends on how the radio bearer is setup. A radio bearer may be a data radio bear (DRB) for a user plane data transmission and/or reception, or a signalling radio bearer (SRB) for a control plane data transmission and/or reception. A DRB configuration may include a DRB identity, an evolved packet system (EPS) bearer identity, a packet data convergence protocol (PDCP) configuration (e.g., header compression configuration), a radio link control (RLC) configuration, a logical channel identity and a logical channel configuration (e.g. priority and logical channel group). A SRB configuration may include a SRB identity, the RLC configuration and the logical channel configuration. In the dual connectivity, there may be three types of radio bearer: a master cell group (MCG) bearer, a secondary cell group (SCG) bearer and a split bearer. The MCG bearer may utilize radio protocols located at a MeNB, to use the MeNB radio resources (i.e. time and frequency resources). The SCG bearer may utilize radio protocols located at a SeNB, to use the SeNB radio resources. The split bearer may utilize protocols located at both the MeNB and the SeNB, to use both the MeNB resources and the SeNB resources. A DRB may be the MCG bearer, the SCG bearer or the split bearer. A SRB may be configured as the MCG bearer or the split bearer. For simplicity, the UE is used to represent the communication device 100 in the following embodiments.

Figure 3:
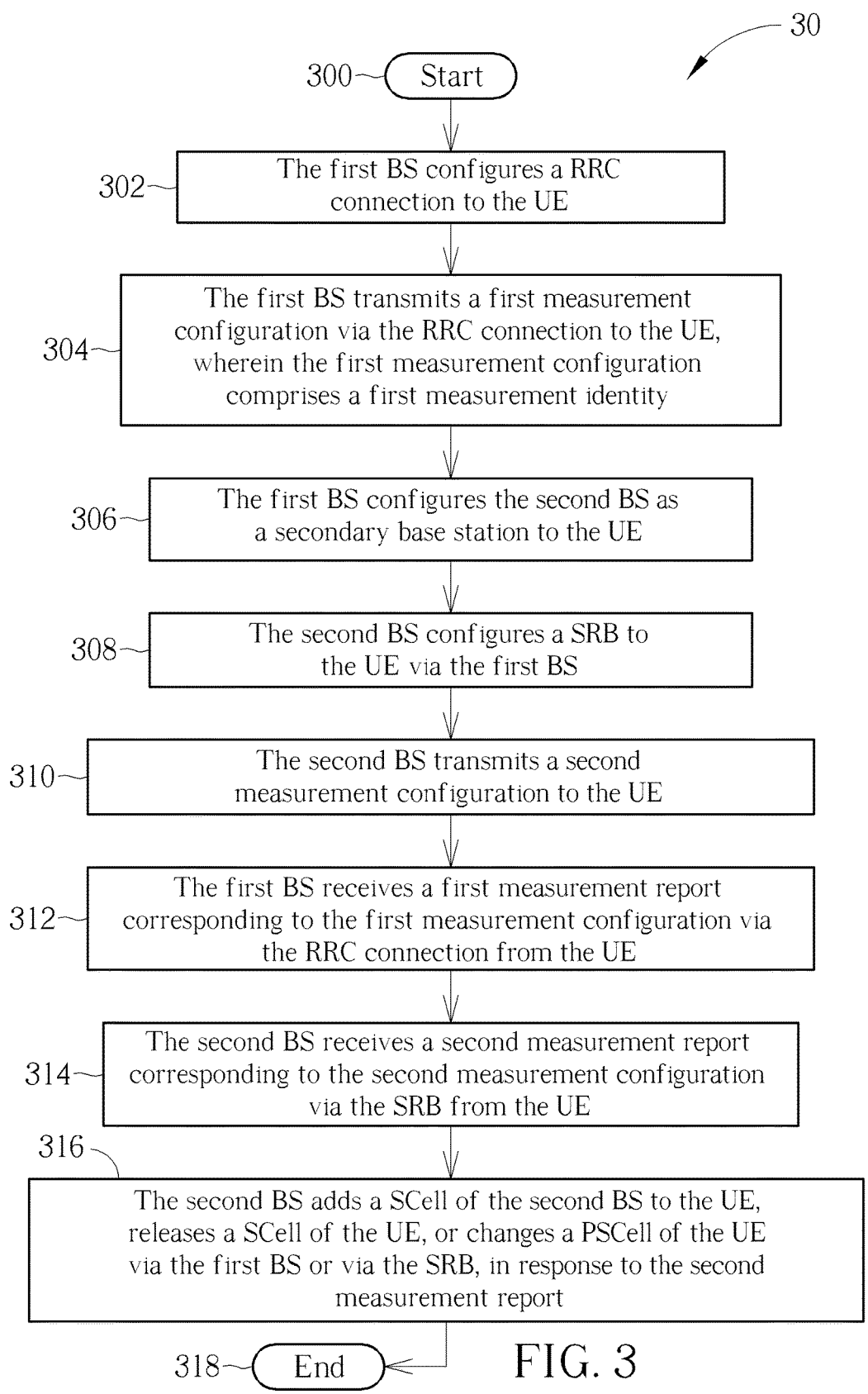
FIG. 3 is a flowchart of a process according to an example of the present invention.

FIG. 3 is a flowchart of a process 30 according to an example of the present invention. The process 30 may be utilized in a first BS (e.g., the BS 102) and a second BS (e.g., the BS 104), for handling simultaneous communications between a UE, the first BS and the second BS. The process 30 may be compiled into the program code 214 and includes the following steps:

Step 300: Start.

Step 302: The first BS configures a radio resource control (RRC) connection to the UE.

Step 304: The first BS transmits a first measurement configuration via the RRC connection to the UE, wherein the first measurement configuration comprises a first measurement identity.

Step 306: The first BS configures the second BS as a SeNB to the UE.

Step 308: The second BS configures a SRB to the UE via the first BS.

Step 310: The second BS transmits a second measurement configuration to the UE.

Step 312: The first BS receives a first measurement report corresponding to the first measurement configuration via the RRC connection from the UE.

Step 314: The second BS receives a second measurement report corresponding to the second measurement configuration via the SRB from the UE.

Step 316: The second BS adds a SCell of the second BS to the UE, releases a SCell of the UE, or changes a PSCell of the UE via the first BS or via the SRB, in response to the second measurement report.

Step 318: End.

According to the process 30, the first BS (e.g., MeNB) configures a RRC connection to the UE, and transmits a first measurement configuration via the RRC connection to the UE, wherein the first measurement configuration includes a first measurement identity. Then, the first BS configures the second BS as a secondary base station to the UE. The second BS configures a SRB (i.e., a SCG bearer) to the UE via the first BS. Then, the second BS transmits a second measurement configuration to the UE. Accordingly, the first BS receives a first measurement report corresponding to the first measurement configuration via the RRC connection from the UE, and the second BS receives a second measurement report corresponding to the second measurement configuration via the SRB from the UE, directly. Thus, the second BS adds a SCell of the second BS to the UE, releases a SCell of the UE, or changes a PSCell of the UE via the first BS or via the SRB according to measurement result(s) (e.g., reference signal received power (RSRP) and/or reference signal received quality (RSRQ)) in the measurement report.

Realization of the process 30 is not limited to the above description.

In one example, the RRC connection may include another SRB. In one example, the second BS may transmit the second measurement configuration to the UE via the first BS (i.e., via the RRC connection) or via the SRB (i.e., via the radio resources of the second BS). That is, the second BS transmits the second measurement configuration to the UE directly or indirectly.

In one example, the second BS may configure the SRB to the UE by transmitting a configuration of the SRB to the first BS, wherein the configuration of the SRB is further transmitted by the first BS to the UE via the RRC connection.

In one example, the first and second BSs may independently allocate the first measurement identity of the first measurement configuration and a second measurement identity of the second measurement configuration, respectively. It should be noted that the first and second measurement identities maybe the same or different.

In one example, the first BS may transmit the first measurement identity of the first measurement configuration to the second BS. The second BS may set the second measurement identity of the second measurement configuration different from the first measurement identity. That is, the measurement configuration may be uniquely identified with measurement identities for the UE.

In one example, the transmission of the second measurement report from the UE maybe triggered by an event. In one example, the event may be in a reporting configuration of the second measurement configuration. In one example, the measurement result(s) in the second measurement report transmitted from the UE are made by the UE according to the measurement on a component carrier of the second BS.

In one example, the second BS may add the SCell of the second BS to the UE, release the SCell of the UE, or change the PSCell of the UE via the first BS or via the SRB by transmitting a RRCConnectionReconfiguration message including a SCG configuration (e.g., SCG-ConfigPartSCG-r12) to the UE via the first BS or via the SRB.

Figure 4:
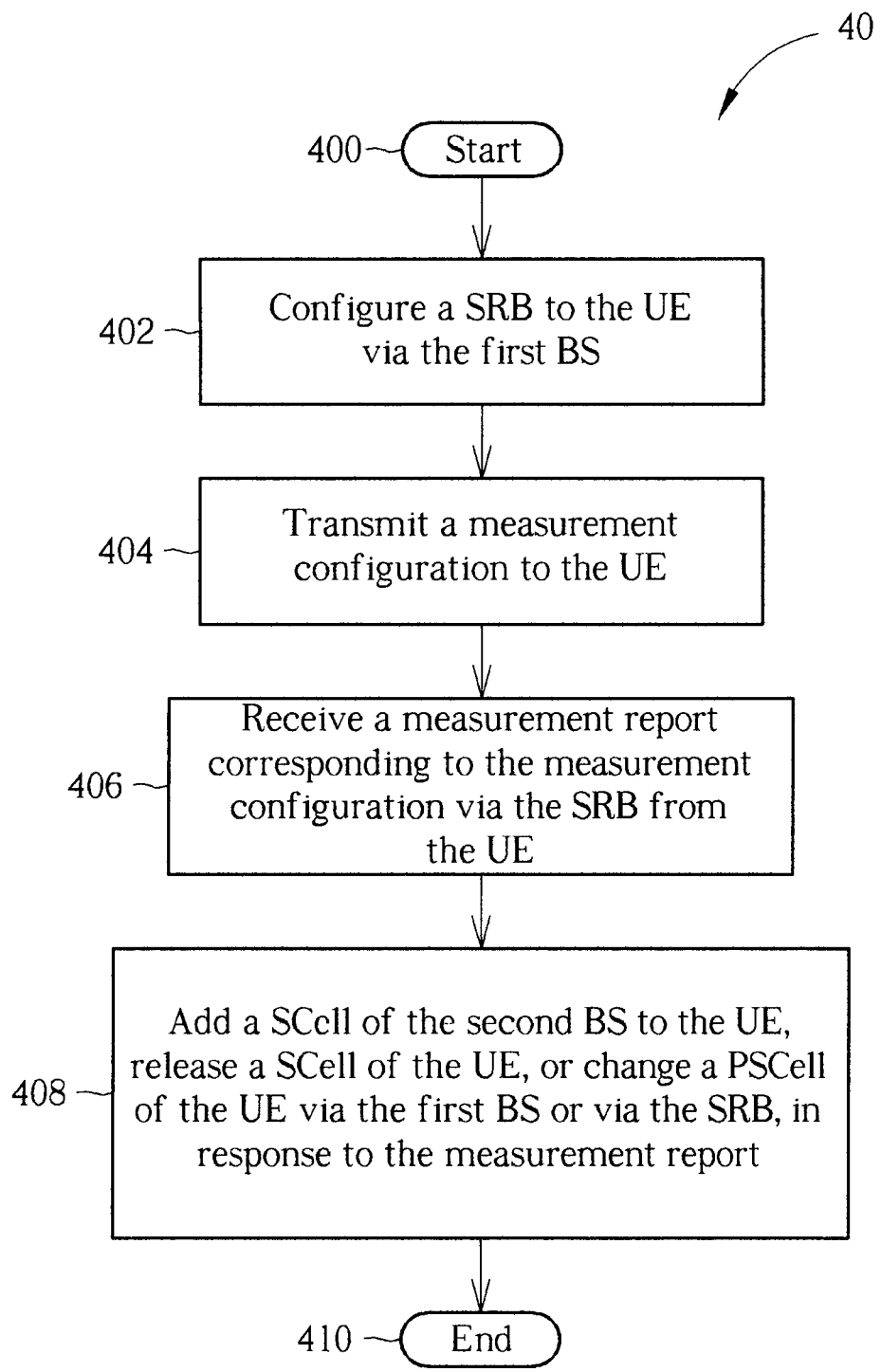
FIG. 4 is a flowchart of a process according to an example of the present invention.

Operations of the second BS in the above description may be summarized into a process 40 in FIG. 4. The process 40 maybe compiled into the program code 214 and includes the following steps:

Step 400: Start.

Step 402: Configure a SRB to the UE via the first BS.

Step 404: Transmit a measurement configuration to the UE.

Step 406: Receive a measurement report corresponding to the measurement configuration via the SRB from the UE.

Step 408: Add a SCell of the second BS to the UE, release a SCell of the UE, or change a PSCell of the UE via the first BS or via the SRB, in response to the measurement report.

Step 410: End.

According to the process 40, the second BS configures a SRB to the UE via the first BS, and transmits a measurement configuration to the UE. Then, the second BS receives a measurement report corresponding to the measurement configuration via the SRB from the UE, and adds a SCell of the second BS to the UE, releases a SCell of the UE, or changes a PSCell of the UE via the first BS or via the SRB according to measurement result(s) (e.g., RSRP and/or RSRQ) in the measurement report. As a result, the second BS takes an action immediately according to the measurement result(s) (e.g., RSRP and/or RSRQ) in the measurement report.

Variations of the process 40 can be referred to the above examples, and are not narrated herein.

Figure 5:
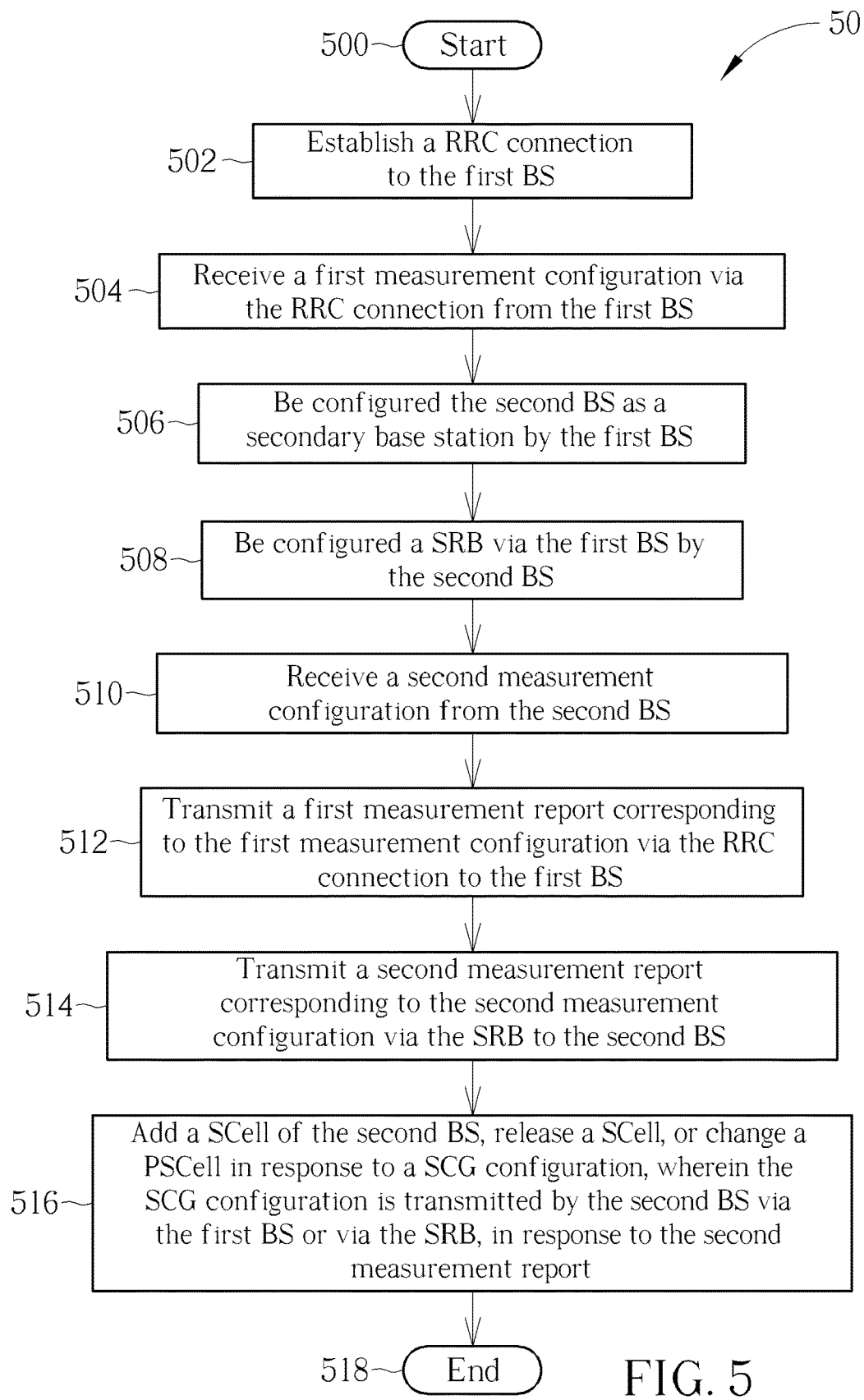
FIG. 5 is a flowchart of a process according to an example of the present invention.

FIG. 5 is a flowchart of a process 50 according to an example of the present invention. The process 50 may be utilized in a UE, for handling simultaneous communications with a first BS (e.g., the BS 102) and a second BS (e.g., the BS 104). The process 50 may be compiled into the program code 214 and includes the following steps:

Step 500: Start.

Step 502: Establish a radio resource control (RRC) connection to the first BS.

Step 504: Receive a first measurement configuration via the RRC connection from the first BS.

Step 506: Be configured the second BS as a secondary base station by the first BS.

Step 508: Be configured a SRB via the first BS by the second BS.

Step 510: Receive a second measurement configuration from the second BS.

Step 512: Transmit a first measurement report corresponding to the first measurement configuration via the RRC connection to the first BS.

Step 514: Transmit a second measurement report corresponding to the second measurement configuration via the SRB to the second BS.

Step 516: Add a SCell of the second BS, release a SCell, or change a PSCell in response to a SCG configuration, wherein the SCG configuration is transmitted by the second BS via the first BS or via the SRB, in response to the second measurement report.

Step 518: End.

According to the process 50, the UE establishes a RRC connection to the first BS. Then, the UE receives a first measurement configuration via the RRC connection from the first BS. The UE is configured the second BS as a secondary base station by the first BS, and is configured a SRB via the first BS by the second BS. That is, the UE receives a first message indicating the second BS as the secondary base station from the first BS, and receives a second message indicating the SRB (e.g., a configuration of the SRB) from the first BS. The first and second messages may be the same or different. The UE receives a second measurement configuration from the second BS. Accordingly, the UE transmits a first measurement report corresponding to the first measurement configuration via the RRC connection to the first BS, and transmits a second measurement report corresponding to the second measurement configuration via the SRB to the second BS. Further, the UE adds a SCell of the second BS, releases a SCell, or changes a PSCell in response to a SCG configuration, wherein the SCG configuration is transmitted by the second BS via the first BS or via the SRB, in response to measurement result(s) (e.g., RSRP and/or RSRQ) of the second measurement report.

Realization of the process 50 is not limited to the above description. Examples described for the processes 30 and process 40 can be applied to the process 50.

In one example, the UE may receive the second measurement configuration from the second BS via the RRC connection (i.e., the first BS) or via the SRB (i.e., via the radio resources of the second BS). It should be noted that the UE may not be able to uniquely identify a measurement configuration with a measurement identity, because the measurement identity may not be unique in both the first BS and the second BS as described above. In addition, according to the prior art, a newly received measurement configuration may replace a stored measurement configuration, if the measurement identities of the received measurement configuration and the stored measurement configuration are the same.

In one example, the UE may associate the first measurement configuration to the first BS, and may associate the second measurement configuration to the second BS. That is, the UE may identify the measurement configuration with the measurement identity uniquely by associating the first/second measurement configuration to the first/second BS. Thus, the UE may not replace the stored measurement configuration (i.e., the first measurement configuration) associated to the first BS with the received measurement configuration (i.e., the second measurement configuration) associated to the second BS. As a result, the UE may manage the first measurement configuration received from the first BS and the second measurement configuration received from the second BS, respectively. The problem that a first measurement configuration configured by the first BS maybe replaced by a second measurement configuration configured by the second BS if measurement identities of the first and second measurement configurations are the same according to the prior art is solved.

Figure 6:
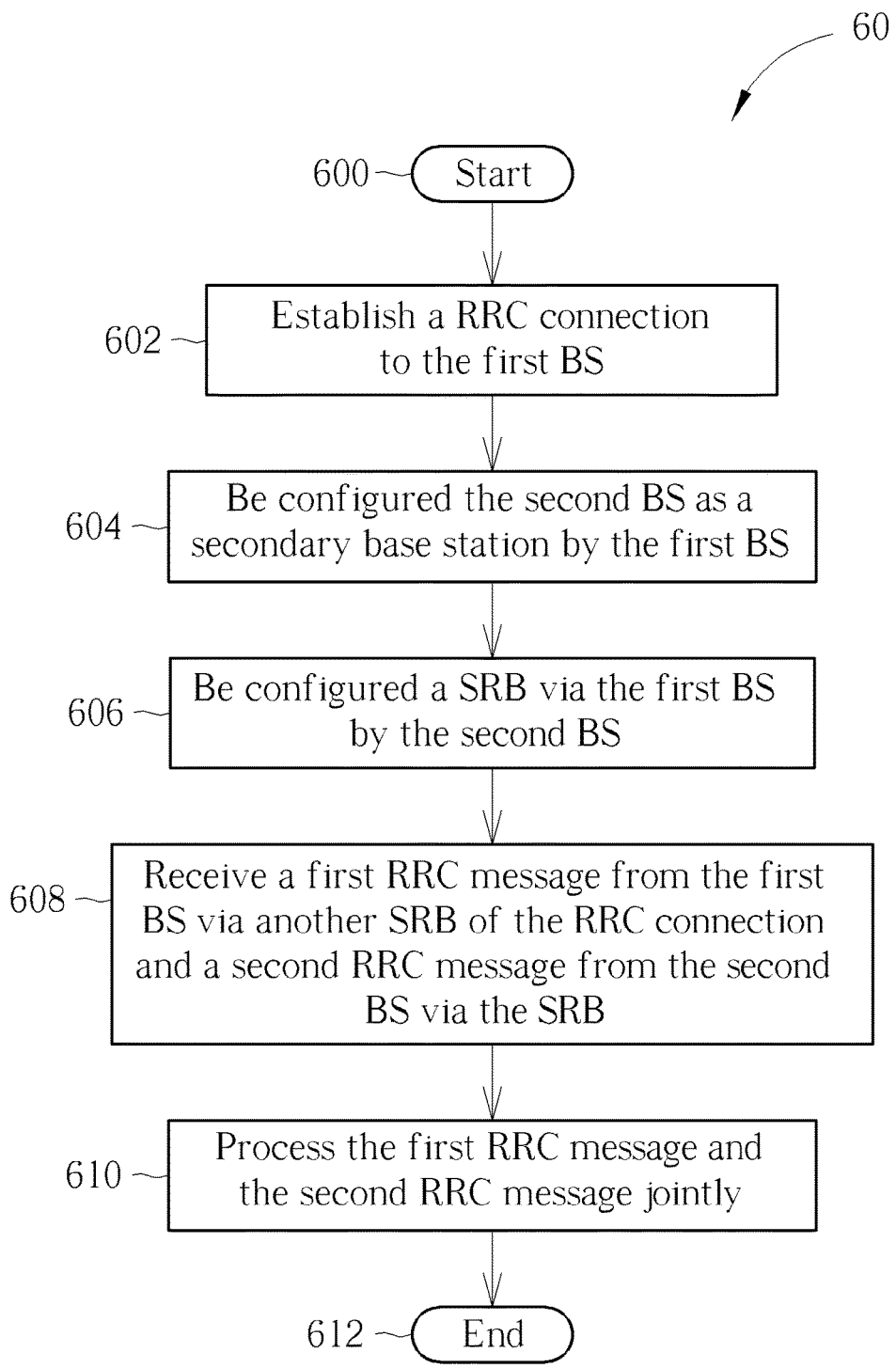
FIG. 6 is a flowchart of a process according to an example of the present invention.

FIG. 6 is a flowchart of a process 60 according to an example of the present invention. The process 60 may be utilized in a UE, for handling simultaneous communications with a first BS (e.g., the BS 102) and a second BS (e.g., the BS 104). The process 60 may be compiled into the program code 214 and includes the following steps:

Step 600: Start.

Step 602: Establish a RRC connection to the first BS.

Step 604: Be configured the second BS as a secondary base station by the first BS.

Step 606: Be configured a SRB via the first BS by the second BS.

Step 608: Receive a first RRC message from the first BS via another SRB of the RRC connection and a second RRC message from the second BS via the SRB.

Step 610: Process the first RRC message and the second RRC message jointly.

Step 612: End.

According to the process 60, the UE establishes a RRC connection to the first BS. Then, the UE is configured the second BS as a secondary base station by the first BS, and is configured a SRB via the first BS by the second BS. That is, the UE receives a message indicating the second BS as the secondary base station from the first BS, and receives another second message indicating the SRB (e.g., a configuration of the SRB) from the first BS. The message and the other message may be the same message or different messages. Further, the UE receives a first RRC message from the first BS via another SRB of the RRC connection and a second RRC message from the second BS via the SRB, and processes the first RRC message and the second RRC message jointly (e.g., simultaneously or in parallel). That is, the UE jointly (e.g., simultaneously or in parallel) handles the first RRC message and the second RRC message, after receiving the first RRC message from the first BS and the second RRC message from the second BS. Thus, the second RRC message is processed immediately without being delayed by the processing of the first RRC message.

In one example, the UE may transmit a first RRC response in response to the first RRC message and a second RRC response in response to the second RRC message jointly (e.g., simultaneously or in parallel). That is, the UE may transmit the second RRC response to the second BS immediately without being delayed by the processing of the first RRC message or the first RRC response.

In one example, a first transaction identifier and a second transaction identifier are allocated independently to the first RRC message and the second RRC message by the first BS and the second BS, respectively. The first and second transaction identifiers may be the same or different.

In one example, the UE may jointly (e.g., simultaneously or in parallel) process the first and second transaction identifiers, wherein the first and the second transaction identifiers are generated by the first and second BSs, respectively. That is, the first transaction identifier is associated to the first BS and the second transaction identifier is associated to the second BS. In other words, a transaction identifier is unique for each BS. A transaction of a RRC message is uniquely identified with the transaction identifier for the UE for each BS.

In one example, the first RRC message may include a first radio configuration related to the first BS, and the second RRC message may include a second radio configuration related to the second BS. The radio configuration may include at least one of a physical resource configuration, a medium access control (MAC) configuration, a security configuration, a reconfiguration of a RLC configuration, a PDCP configuration, a measurement configuration, and other configuration such as In-Device coexistence configuration.

In one example, the UE may process a plurality of RRC messages received from the first BS according to an order of receptions of the plurality of RRC messages. That is, a RRC message which is received earlier is processed earlier. In one example, the UE may process a plurality of RRC messages received from the second BS according to an order of receptions of the plurality of RRC messages. That is, a RRC message which is received earlier is processed earlier.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a method and related communication device for handling simultaneous communications. Accordingly, the second BS may receive the measurement result(s) from the UE directly, and may take an action immediately according to the measurement result(s). As a result, the performance of the mobility management and radio resource management for the UE are improved for the second BS (e.g., SeNB).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling simultaneous communications between a communication device, a first base station and a second base station, the method comprising:
   the first base station configuring a radio resource control (RRC) connection to the communication device;
   the first base station transmitting a first measurement configuration via the RRC connection to the communication device, wherein the first measurement configuration comprises a first measurement identity;
   the first base station configuring the second base station as a secondary base station to the communication device;
   the second base station configuring a signalling radio bearer (SRB) to the communication device via the first base station;
   the second base station transmitting a second measurement configuration to the communication device;
   the first base station receiving a first measurement report corresponding to the first measurement configuration via the RRC connection from the communication device;
   the second base station receiving a second measurement report corresponding to the second measurement configuration via the SRB from the communication device; and
   the second base station adding a secondary cell (SCell) of the second base station to the communication device, releasing a SCell of the communication device, or changing a primary secondary cell (PSCell) of the communication device via the first base station or via the SRB, in response to the second measurement report.

2. The method of claim 1, wherein the step of the second base station transmitting the second measurement configuration to the communication device comprises:
   the second base station transmitting the second measurement configuration to the communication device via the first base station or via the SRB; and
   the step of the second base station configuring the SRB to the communication device via the first base station comprises:
   the second base station transmitting a configuration of the SRB to the first base station, wherein the configuration of the SRB is further transmitted by the first base station to the communication device via the RRC connection.

3. The method of claim 1, wherein the first base station and the second base station independently allocates the first measurement identity of the first measurement configuration and a second measurement identity of the second measurement configuration, respectively.

4. The method of claim 1, further comprising:
   the first base station transmitting the first measurement identity of the first measurement configuration to the second base station; and
   the second base station setting a second measurement identity of the second measurement configuration, wherein the second measurement identity of the second measurement configuration is different from the first measurement identity.

5. A second base station for handling simultaneous communications between a communication device, a first base station and the second base station, comprising:
   a storage unit for storing instructions of:
   configuring a signalling radio bearer (SRB) to the communication device via the first base station;
   transmitting a measurement configuration to the communication device;
   receiving a measurement report corresponding to the measurement configuration via the SRB from the communication device; and
   adding a secondary cell (SCell) of the second base station to the communication device, releasing a SCell of the communication device, or changing a primary secondary cell (PSCell) of the communication device via the first base station or via the SRB, in response to the measurement report; and
   a processing means, coupled to the storage unit, configured to execute the instructions stored in the storage unit.

6. The second base station of claim 5, wherein the instruction of transmitting the measurement configuration to the communication device comprises:
   transmitting the measurement configuration to the communication device via the first base station or via the SRB; and
   the instruction of configuring the SRB to the communication device via the first base station comprises:
   transmitting a configuration of the SRB to the first base station, wherein the configuration of the SRB is further transmitted by the first base station to the communication device via a radio resource control (RRC) connection.

7. The second base station of claim 5, wherein the storage unit further stores an instruction of:
   allocating a measurement identity of the measurement configuration, wherein the measurement identity of the measurement configuration is allocated independently from another measurement identity of another measurement configuration allocated by the first base station.

8. The second base station of claim 5, wherein the storage unit further stores an instruction of:
   setting a measurement identity of the measurement configuration, wherein the measurement identity of the measurement configuration is different from another measurement identity of another measurement configuration transmitted by the first base station.

9. A communication device for handling simultaneous communications with a first base station and a second base station, comprising:
   a storage unit for storing instructions of:
   establishing a radio resource control (RRC) connection to the first base station;
   receiving a first measurement configuration via the RRC connection from the first base station;
   being configured the second base station as a secondary base station by the first base station;

being configured a signalling radio bearer (SRB) via the first base station by the second base station;
receiving a second measurement configuration from the second base station;
transmitting a first measurement report corresponding to the first measurement configuration via the RRC connection to the first base station;
transmitting a second measurement report corresponding to the second measurement configuration via the SRB to the second base station; and
adding a secondary cell (SCell) of the second base station, release a SCell, or change a primary secondary cell (PSCell) in response to a secondary cell group (SCG) configuration, wherein the SCG configuration is transmitted by the second base station via the first base station or via the SRB, in response to the second measurement report; and
a processing means, coupled to the storage unit, configured to execute the instructions stored in the storage unit.

10. The communication device of claim 9, wherein the instruction of receiving the second measurement configuration from the second base station comprises:
receiving the second measurement configuration from the second base station via the RRC connection or via the SRB; and
the instruction of being configured the SRB via the first base station by the second base station comprises:
receiving a configuration of the SRB from the second base station via the RRC connection.

11. The communication device of claim 9, wherein the storage unit further stores instructions of:
associating the first measurement configuration to the first base station; and
associating the second measurement configuration to the second base station.

12. A communication device for handling simultaneous communications with a first base station and a second base station, comprising:
a storage unit for storing instructions of:
establishing a radio resource control (RRC) connection to the first base station;
being configured the second base station as a secondary base station by the first base station via the RRC connection;
being configured a signalling radio bearer (SRB) via the first base station by the second base station;
receiving a first RRC message from the first base station via another SRB of the RRC connection and a second RRC message from the second base station via the SRB; and
processing the first RRC message and the second RRC message jointly; and
a processing means, coupled to the storage unit, configured to execute the instructions stored in the storage unit.

13. The communication device of claim 12, wherein the storage unit further stores an instruction of:
transmitting a first RRC response in response to the first RRC message and a second RRC response in response to the second RRC message jointly.

14. The communication device of claim 12, wherein a first transaction identifier and a second transaction identifier are allocated independently to the first RRC message and the second RRC message by the first base station and the second base station, respectively;
and the first RRC message comprises a first radio configuration related to the first base station, and the second RRC message comprises a second radio configuration related to the second base station.

15. The communication device of claim 12, wherein the storage unit further stores instructions of:
processing a plurality of RRC messages received from the first base station according to an order of receptions of the plurality of RRC messages; and
processing a plurality of RRC messages received from the second base station according to an order of receptions of the plurality of RRC messages.

* * * * *